United States Patent Office 3,752,819
Patented Aug. 14, 1973

3,752,819
5-PHENYL-ISOXAZOLE-3-CARBOXYLIC ACIDS AND THEIR DERIVATIVES

Jean B. Philippe, Paris, France, assignor to Ferlux, Puy-de-Dome, France
No Drawing. Filed Dec. 2, 1970, Ser. No. 94,527
Claims priority, application France, Dec. 23, 1969, 6944556
Int. Cl. C07d 31/36
U.S. Cl. 260—295 R    4 Claims

ABSTRACT OF THE DISCLOSURE

New derivatives of 5-phenyl-isoxazole-3-carboxylic acid of the general formula

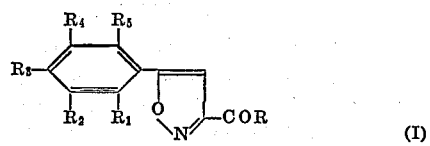

in which R represents a free or esterified hydroxylated group, an aminated group or hydrazine group.

These derivatives are prepared by the action of hydroxlamine or benzoylpyruvic acids.

Therapeutical application of the derivatives of the invention particularly as salidiuretics, sedatives, analgesics.

---

The present invention relates to 5-phenylisoxazole-3-carboxylic acids which may or may not be substituted on the phenyl group and their mineral and organic salts, esters, amides, carbamate esters, hydrazides, complying with the general formula:

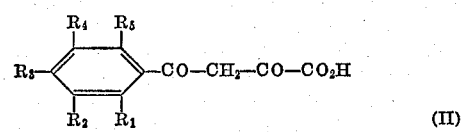

in which: $R_1$, $R_2$, $R_4$ and $R_5$ are hydrogen atoms, and $R_3$ is a hydrogen atom, a hydroxy, alkyl, alkoxy, oxyacetic or nitro group, a halogen atom such as chlorine, bromine, fluorine, or $R_4$ is a hydrogen atom, $R_3$ and $R_5$ are a hydrogen atom, a hydroxyl group or methoxy group, $R_1$ and $R_2$ are a hydrogen atom or a methoxy group or $R_1$, $R_4$ and $R_5$ are hydrogen atoms, $R_3$ and $R_2$ are a methoxyl group. R may be:

(a) A hydroxylated group, the compounds of the Formula I then being 5-phenyl-isoxazole-3-carboxylic acids; the invention also relates to the alkali metal salts of these acids such as sodium or potassium, the addition salts of these acids with organic bases such as N-methylpiperazine, the dialkylamines, particularly diethylamine, the dialkylaminoalkanes, the alkylpyridine group.

(b) A group

$R_6$ and $R_7$ may be a hydrogen atom, an alkyl group, a halogen-alkyl group, an aryl group which may or may not be substituted, cycloalkyl, cyanoalkyl group, a group

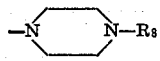

$R_8$ being a hydroxy-alkyl group—a substituted or unsubstituted hydrazine group of the type:

—HN—NH—$R_9$, $R_9$ being a hydrogen atom, an alkyl, aryl or arylalkyl group—in the guanidine group:

(c) A group —$OR_{10}$, in which $R_{10}$ is a dialkylaminoalkyl or arylalkyl group.

The compounds of the general Formula I are useful compounds from the pharmacological point of view because they possess a noteworthy salidiuretic activity, which is equal to or even superior to that of hydrochlorothiazide, to which there are added, for some of them, analgesic and sedative.

All the compounds whose groups $R_1$ is different from OH, are obtained by the action of hydroxylamine hydrochloride on the benzoylpyruvic acids complying with the formula:

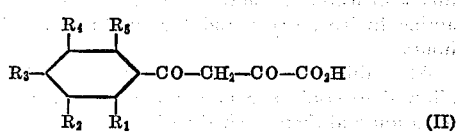

in which $R_1$, $R_2$, $R_3$, $R_4$, $R_5$ have the meanings given above.

The cyclodehydration by hydroxylamine hydrochloride is carried out:

either under a reflux in concentrated hydrochloric acid; or under a reflux in acetic acid;
or at ambient temperature in 95° ethyl alcohol in the presence of an alkali mineral agent such as sodium carbonate;
or under a reflux in absolute ethyl alcohol.

The benzoylpyruvic acids of the general Formula II are prepared by means of the condensation process described by Claisen. The latter consists in particular in reacting the corresponding substituted or unsubstituted acetophenone and ethyl oxalate in the presence of sodium methylate in a solvent such as petrol ether or heptane.

The compounds in which $R_1$ represents a hydroxyl group are obtained by the action of hydroxylamine on the corresponding chromone-2-carboxylic acid; the reaction is carried out under a reflux in a solvent with a high boiling point such as dimethylformamide in the presence of a sodium alcoholate in a sufficient quantity for the medium to be basic.

The amine salts are prepared in absolute ethyl alcohol by heating the acid of the Formula I (R=OH) and the chosen amine on a waterbath until they dissolve completely.

The alkali metal salts are obtained by heating the compound I (R=OH) and the acid carbonate of the metal chosen under a reflux in ethyl alcohol.

All the amides are prepared by reacting the acid chloride of the general formula:

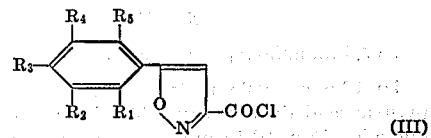

on the corresponding primary or secondary amine, leading to the N-substituted derivatives of the Formula I in which R has the meaning defined in paragraph (b).

The acid chloride dissolved in dichlorethane is added cold to a solution of the chosen amine in water in the presence of an agent which is capable of taking up the hydrochloric acid formed, such as sodium bicarbonate.

The acid chloride (III) is obtained by the action of thionyl chloride on the acid in dichlorethane, by heating the reaction mixture under a reflux until it dissolved.

The esters are prepared by the action of the acid chloride on the alcohol or amino-alcohol in dioxane at boiling point. As regards the amino-alcohols, the ester is obtained in the form of the hydrochloride which makes it possible to increase the solubility of the product in water.

The invention will be better understood from a reading of the detailed description which follows of a few non-restrictive examples of modes of execution according to the invention.

EXAMPLE I 5-phenyl-isoxazole-3-carboxylic acid

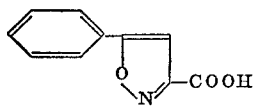

19.2 g. (0.1 mole) of benzoylpyruvic acid are suspended in 200 mls. of concentrated hydrochloric acid. To this suspension one adds 7.7 g. (0.11 mole) of hydroxylamine hydrochloride and the mixture is refluxed for 3 hours.

After diluting with 300 mls. of water, the mixture is allowed to cool. The precipitate formed is recovered by filtration and then washed with water several times. After recrystallisation from water in the presence of carbon black, one obtains 9.5 g. of 5-phenyl-isoxazole-3-carboxylic acid, which takes the form of small white needles melting at 160° C. Yield: 50%.

The following acids are prepared by using the same process:

p-hydroxy-5-phenyl-isoxazole-3-carboxylic acid;
p-methoxy-5-phenyl-isoxazole-3-carboxylic acid p-5-tolyl-isoxazole-3-carboxylic acid;
p-chloro-5-phenyl-isoxazole-3-carboxylic acid;
p-bromo-5-phenyl-isoxazole-3-carboxylic acid;
p-fluoro-5-phenyl-isoxazole-3-carboxylic acid;
5-(2,4-dimethoxyphenyl)-isoxazole-3-carboxylic acid;
5-(3,4-dimethoxyphenyl)-isoxazole-3-carboxylic acid;
5-(2,4,5-trimethoxyphenyl)-isoxazole-3-carboxylic acid;
p-propoxy-5-phenyl-isoxazole-3-carboxylic acid;
p-butoxy-5-phenyl-isoxazole-3-carboxylic acid.

The properties of these acids as well as the yields and the recrystallisation solvents are shown in Table I.

EXAMPLE II p-methoxy-5-phenyl-isoxazole-3-carboxylic acid

To 22.2 g. (0.1 mole) of p-methoxybenzoylpyruvic acid dissolved in 250 mls. of glacial acetic acid one adds 7.7 g. (0.11 mole) of hydroxylamine hydrochloride and it is heated for 3 hours under a reflux.

It is concentrated to dryness and the residue suspended in water. The residue is filtered off. The product obtained is recrystallised from a mixture of water and alcohol.

This method, which is less general than the one described in Example 1, may nevertheless be preferred for certain compounds (Table II).

EXAMPLE III 5-(2,4-dimethoxyphenyl)-isoxazole-3-carboxylic acid

To 12.6 g. (0.05 mole) of 2,4 - dimethoxy-benzoylpyruvic acid dissolved in 100 mls. of 95° ethyl alcohol one adds 16 g. (0.15 mole) of sodium carbonate and 3.5 g. (0.05 mole) of hydroxylamine hydrochloride. The agitation of the mixture is continued for 24 hours at ambient temperature.

After dilution it is acidified with concentrated hydrochloric acid, the precipitated 5-(2,4-dimethoxyphenyl)-isoxazole-3-carboxylic acid is filtered off and washed with water.

After recrystallization from water and acetone 6.5 g. are obtained of a product melting at 170° C. Yield: 52%.

By this method one prepares 5-phenyl-isoxazole-3-carboxylic acid with a yield of 40%, p-methoxy-5-phenyl-isoxazole-3-carboxylic acid with a yield of 62%. These acids have the same properties as those which have been prepared by one of the preceding methods.

EXAMPLE IV p-Isopropyl-5-phenyl-isoxazole-3-carboxylic acid 23.4 g. (0.1 mole) of p-isopropyl-benzoylpyruvic acid are suspended in 120 mls. of absolute ethyl alcohol and 7 g. (0.1 mole) of hydroxylamine hydrochloride are added. The mixture is heated under a reflux for 4 hours.

The ethyl alcohol is distilled off in vacuo. 150 mls. of water are added to the residue, it is filtered and washed with water. After recrystallisation from water and acetone one obtains 14.3 g. of p-isopropyl-5-phenyl-isoxazole-3-carboxylic acid. Yield: 62%. M.P.: 131° C.

It had not been possible to obtain this acid with a satisfactory yield using the preceding methods.

EXAMPLE V o-Hydroxy-5-phenyl-isoxazole-3-carboxylic acid

This acid can be prepared by two different methods. The first of these (method A) makes use as raw material of a benzopyronic heterocyclic compound (chromone-2-carboxylic acid) which, when reacted with hydroxylamine, undergoes an opening of the ring at the point of the hetero-atom, followed by cyclisation.

The second method (method B) is analogous to that described in the preceding examples because it makes use of a salt of ortho-hydroxybenzoylpyruvic acid.

METHOD A

To a solution of 19 g. (0.1 mole) of chromone-2-carboxylic acid in 200 mls. of dimethylformamide one adds 7 g. (0.1 mole) of hydroxylamine hydrochloride and a solution of sodium methanolate obtained from 9.2 g. (0.4 mole) of sodium and 60 mls. of methyl alcohol. The mixture is heated under a reflux for 24 hours.

After the elimination of the dimethylformamide by distillation in vacuo the residue is poured into 300 mls. of water and the mixture is acidified with concentrated hydrochloric acid. The o-hydroxy-5-phenyl-isoxazole-3-carboxylic acid which is precipitated is filtered off and is then recrystallized from a mixture of water and acetone. 10 g. of the product are collected. Yield: 50%. M.P.: 184° C.

*Elementary analysis.*—Calculated (percent): C, 58.54; H, 3.42; N, 6.82. Found (percent): C, 59.05; H, 3.67; N, 6.73.

METHOD B

A Claisen condensation is carried out of 13.6 g. (0.1 mole) of o-hydroxyacetophenone with 14.6 g. (0.1 mole) of ethyl oxalate in the presence of 10.8 g. (0.2 mole) of sodium ethanolate dissolved in ethyl alcohol. One obtains the sodium salt of o-hydroxybenzoylpyruvic acid. If it is acidified, one obtains practically exclusively chromone-2-carboxylic acid; the reaction therefore ends with the sodium salt.

28 g. (0.4 mole) of hydroxylamine hydrochloride are added and then it is brought to the boil for 4 hours; the ethyl alcohol is concentrated by evaporation in vacuo and the residue is taken up in 300 mls. of water.

9.2 g. of o-hydroxy-5-phenyl-isoxazole-3-carboxylic acid is obtained, which is identical to the preceding product. Yield: 46%. M.P.: 183° C.

EXAMPLE VI

Potassium p-bromo-5-phenyl-isoxazole-3-carboxylate (No. 1)

13.4 g. (0.05 mole) of p-bromo-5-phenyl-isoxazole-3-carboxylic acid are suspended in 80 mls. of absolute alcohol. 4.5 g. (0.045 mole) of potassium bicarbonate are added and the mixture is heated under a reflux for 4 to 5 hours.

It is cooled and the mixture filtered. The precipitate is washed with a little acetone and then dried in an oven at 60° C. 13.8 g. of dry product are obtained. Yield: 90%.

*Elementary analysis.*—Calculated (percent): C, 39.22; H, 1.65; N, 4.57. Found (percent): C, 39.37; H, 1.66; N, 4.64.

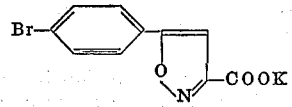
Compound No. 1

EXAMPLE VII

Diethylamine p-chloro-5-phenyl-isoxazole-3-carboxylate (No. 13)

11.2 g. (0.05 mole) of p-chloro-5-phenyl-isoxazole-3-carboxylic acid are suspended in 40 mls. of absolute ethyl alcohol and 3.7 g. (0.05 mole) of diethylamine are added. It is heated under a reflux until it dissolved completely, which takes about 20 minutes.

On cooling, 11.9 g. of diethylamine p-chloro-5-phenyl-isoxazole-3-carboxylate are precipitated. Yield: 80%. M.P.: 98° C.

By the same method one can prepare the following products:

diethylamine 5-phenyl-isoxazole-carboxylate;
diethylamine p-methoxy-5-phenyl-isoxazole-carboxylate;
diethylamine para-nitro-5-phenyl-isoxazole-carboxylate;
diethylamine para-bromo-5-phenyl-isoxazole-carboxylate;
diethylamine para-fluoro-5-phenyl-isoxazole-carboxylate;
diethylamine para-hydroxy-5-phenyl-isoxazole-carboxylate;
diethylamine 5-para-tolyl-isoxazole-carboxylate;
diethylamine 3,4-dimethoxyphenyl-isoxazole-carboxylate;
diethylamine 2,4-dimethoxyphenyl-isoxazole-carboxylate.

Details of these products are shown in Table III.

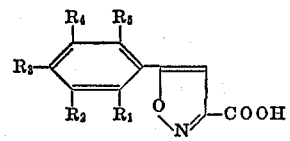

TABLE I

| $R_1$ | $R_2$ | $R_3$ | $R_4$ | $R_5$ | Yield, percent | M.P., °C. | Recrystallized solvent | Calculated C | Calculated H | Calculated N | Found C | Found H | Found N |
|---|---|---|---|---|---|---|---|---|---|---|---|---|---|
| H | H | H | H | H | 50 | 160 | Water | 63.49 | 3.73 | 7.40 | 63.63 | 3.90 | 7.38 |
| H | H | OH | H | H | 30 | 218 | Water plus acetone | 60.35 | 6.51 | 10.05 | 59.74 | 6.37 | 9.79 |
| H | H | —OCH$_3$ | H | H | 60 | 186 | Water plus alcohol | 60.27 | 4.14 | 6.39 | 60.40 | 4.50 | 6.36 |
| OCH$_3$ | H | —OCH$_3$ | H | H | 60 | 171 | Water plus acetone | 57.83 | 4.44 | 5.62 | 57.24 | 5.10 | 5.60 |
| H | —OCH$_3$ | —OCH$_3$ | H | H | 70 | 174 | do | 57.83 | 4.44 | 5.62 | 57.67 | 4.44 | 5.64 |
| OCH$_3$ | H | —OCH$_3$ | —OCH$_3$ | H | 75 | 201 | do | 56.25 | 4.72 | 5.05 | 56.28 | 4.63 | 4.94 |
| H | H | O(CH$_2$)$_2$CH$_3$ | H | H | 30 | 178 | Water plus alcohol | 62.40 | 5.29 | 5.67 | 62.37 | 5.38 | 5.02 |
| H | H | O(CH$_2$)$_5$CH$_3$ | H | H | 78 | 170 | Water plus acetone | 63.31 | 5.78 | 5.36 | 65.17 | 5.93 | 5.06 |
| H | H | —CH$_3$ | H | H | 50 | 184 | do | 65.01 | 4.47 | 6.88 | 65.40 | 4.69 | 6.86 |
| H | H | —Cl | H | H | 70 | 202 | do | 53.71 | 2.68 | 6.27 | 54.53 | 2.95 | 5.96 |
| H | H | —Br | H | H | 50 | 206 | do | 44.75 | 2.24 | 5.22 | 45.33 | 2.44 | 5.38 |
| H | H | F | H | H | 83 | 178 | do | 59.97 | 2.92 | 6.76 | 59.88 | 3.24 | 6.45 |

TABLE II

| $R_1$ | $R_2$ | $R_3$ | $R_4$ | $R_5$ | Yield, percent | M.P., °C. | Recrystallized solvent | Calculated C | Calculated H | Calculated N | Found C | Found H | Found N |
|---|---|---|---|---|---|---|---|---|---|---|---|---|---|
| H | H | —OCH$_3$ | H | H | 62 | 186 | Water plus alcohol | 60.27 | 4.14 | 6.39 | 59.95 | 4.12 | 6.00 |
| H | H | H | H | H | 30 | 160 | Water | 63.49 | 3.73 | 7.40 | 64.19 | 3.89 | 7.44 |
| OCH$_3$ | H | —OCH$_3$ | H | H | 55 | 171 | Water plus acetone | 57.80 | 4.44 | 5.63 | 57.37 | 4.37 | 5.46 |
| H | H | NO$_2$ | H | H | 25 | 203 | do | 51.25 | 2.57 | 11.95 | 52.05 | 3.00 | 11.60 |

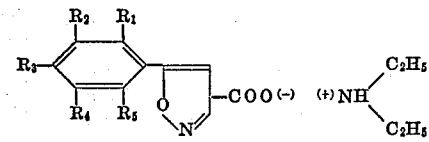

TABLE III

| No. | $R_1$ | $R_2$ | $R_3$ | $R_4$ | $R_5$ | M.P., °C. | Calculated C | Calculated H | Calculated N | Found C | Found H | Found N |
|---|---|---|---|---|---|---|---|---|---|---|---|---|
| 2 | H | H | H | H | H | 97.8 | 64.20 | 6.81 | 10.67 | 63.9 | 6.88 | 10.35 |
| 3 | H | H | CH$_3$ | H | H | 105.7 | 65.19 | 7.28 | 10.12 | 65.55 | 7.30 | 10.08 |
| 4 | H | H | —CH(CH$_3$)$_2$ | H | H | 95.4 | 64.74 | 6.67 | 8.88 | 64.23 | 7.71 | 8.67 |
| 5 | H | H | OH | H | H | 142.7 | 60.35 | 6.51 | 10.05 | 59.74 | 6.37 | 9.79 |
| 6 | OH | H | H | H | H | 147 | 60.35 | 6.51 | 10.05 | 60.15 | 6.42 | 10.26 |
| 7 | H | H | OCH$_3$ | H | H | 110.5 | 61.84 | 6.57 | 9.58 | 61.23 | 6.77 | 9.02 |
| 8 | H | H | O(CH$_2$)$_2$CH$_3$ | H | H | 102.4 | 63.70 | 7.55 | 8.74 | 61.09 | 7.03 | 8.28 |
| 9 | H | H | O(CH$_2$)$_3$CH$_3$ | H | H | 113.6 | 64.69 | 7.84 | 8.41 | 64.96 | 7.85 | 8.20 |
| 10 | OCH$_3$ | H | OCH$_3$ | H | H | 152.2 | 59.61 | 6.83 | 8.69 | 59.33 | 6.92 | 8.90 |
| 11 | H | OCH$_3$ | OCH$_3$ | H | H | 118.2 | 59.61 | 6.83 | 8.69 | 59.94 | 6.72 | 8.34 |
| 12 | H | H | F | H | H | 115 | 60.02 | 6.12 | 10.00 | 59.88 | 6.24 | 9.45 |
| 13 | H | H | Cl | H | H | 98.1 | 56.70 | 5.77 | 9.43 | 57.10 | 5.68 | 8.65 |
| 14 | H | H | Br | H | H | 118.2 | 49.28 | 5.03 | 8.21 | 49.54 | 5.07 | 7.91 |
| 15 | H | H | NO$_2$ | H | H | 137 | 54.71 | 5.58 | 18.67 | 54.63 | 5.39 | 13.11 |

EXAMPLE VIII

N-methylpiperazines 5-(2,4-dimethoxyphenyl)-isoxazole-3-carboxylate (No. 16)

To 12.5 g. (0.05 mole) of 5-(2,4-dimethoxyphenyl)-isoxazole-3-carboxylic acid suspended in 50 mls. of absolute ethyl alcohol one adds 5 g. (0.05 mole) of N-methylpiperazine and it is boiled until completely dissolved (20 to 30 minutes).

After cooling, the precipitate formed is filtered. It is then recrystallised from ethyl alcohol (14 g.). Yield 80 g. M.P.: 145° C.

*Elementary analysis.*—Calculated (percent): C, 58.41, H, 6.63; N, 11.69. Found (percent): C, 58.66; H, 6.61; N, 11.82.

EXAMPLE IX

Ethyl p-bromo-5-phenyl-isoxazole-3-carboxylate (No. 17)

13.4 g. (0.05 mole) of p-bromo-5-phenyl-isoxazole-3-carboxylic acid is suspended in 100 mls. of absolute alcohol; 1 ml. of concentrated sulphuric acid is added and it is heated under a reflux for 3 hours.

After the elimination of the ethyl alcohol by distillation, the residue is diluted with a solution of sodium bicarbonate; the mixture is treated several times with ether and ether solutions are washed with bicarbonate solution. The ether is distilled off until the residue is dry.

The residue is recrystallised from a mixture of water and alcohol. 10.5 g. of ester are obtained. Yield: 70%. M.P.: 126° C.

*Elementary analysis.*—Calculated (percent): C, 48.65; H, 3.41; N, 4.73. Found (percent): C, 48.61; H, 3.25; N, 4.75.

EXAMPLE X

Ethyl 5-(2,4-dimethoxyphenyl)-isoxazole-carboxylate (No. 18)

The mode of operation is identical to that of Example IX. M.P.: 114° C.

*Elementary analysis.*—Calculated: (percent): C, 60.06; H, 5.45; N, 5.06. Found (percent): C, 60.22; H, 5.58; N, 5.54.

EXAMPLE XI

Hydrochloride of esters of amino-alcohols (a) Preparation of the acid chlorides: 5-phenylisoxazole - 3-carboxylic acid suspended in dichlorethane is heated under a reflux in the presence of twice the theoretical quantity of thionyl chloride until it is completely dissolved (from 4 to 15 hours). The dichloroethane is evaporated off in vacuo. Dichloroethane is added to the residue and it is then distilled off in vacuo; by repeating this operation 2 or 3 times the acid chloride is practically free from thionyl chloride and may be used without any further purification.

(b) p - Chloro-5-phenyl-(4'-pyridine)-propyloxy-3-carbonyl-isoxazole hydrochloride: To 4.4 g. (0.05 M) of 4-(3-hydroxy-propyl)-pyridine, dissolved in 30 mls. of anhyrous dioxane one slowly adds, whilst agitating, 12.1 g. of parachloro-5-phenylisoxazole-3-carbonyl dissolved in 50 mls. of anhydrous dioxane. It is heated under a reflux for 5 hours. After distilling off the dioxane in vacuo, hydrochloric ether is added to the residue.

The precipitate obtained is filtered, washed with ether. Yield: 60%.

Using the same mode of operation one prepared:

p-chloro-5-phenyl-3-(4'-pyridine-methoxycarbonyl)-isoxazole hydrochloride;
p-chloro-5-phenyl-3(β-diethylamino-ethoxycarbonyl)-isoxazole hydrochloride;
5-(3,4-dimethoxy-phenyl)-3(β-diethylamino-ethoxycarbonyl)-isoxazole hydrochloride.

The characteristics of these products are shown in Table IV.

EXAMPLE XII

5(3,4-dimethoxy-phenyl)-3-(3'-pyridine-methoxycarbonyl)-isoxazole hydrochloride (No. 20)

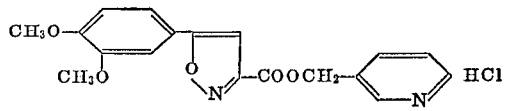

(a) Preparation of 5 - (3,4-dimethoxy-phenyl)-isoxazole)-3-carboxylic acid: To a suspension of 10.8 g. (0.2 mole) of sodium methanolate in 100 mls. of hexane one adds, whilst agitating, a mixture of 18.1 g. (0.1 mole) of 3,4-dimethoxy-acetophenone and 15 g. (0.1 mole) of ethyl oxalate dissolved in 100 mls. of hexane.

One adds 500 mls. of water and acidifies with concentrated hydrochloric acid so as to precipitate the 3,4-dimethoxy-benzoylpyruvic acid which is then washed with water.

To 25.2 g. (0.1 mole) of 3,4-dimethoxy-benzoylpyruvic acid suspended in 200 mls. of concentrated hydrochloric acid one adds 7.7 g. (0.11 mole) of hydroxylamine hydrochloride and it is refluxed for 3 hours.

After dilution with 300 mls. of water, the 3,4-dimethoxy-phenyl-isoxazole-3-carboxylic acid is filtered off, and this is then recrystallised from a mixture of water and acetone. M.P.: 174° C.

*Elementary analysis.*—Calculated (percent): C, 57.8; H, 4.44; N, 5.62. Found (percent): C, 57.67; H, 4.44; N, 5.64.

(b) Preparation of [5-(3,4-dimethoxyphenyl)-3-(3'-pyridine - methoxycarbonyl) - isoxazole] hydrochloride: The mixture of 25 g. (0.1 mole) of 3,4-dimethoxyphenyl-isoxazole-3-carboxylic acid suspended in 150 mls. of anhydrous dichlorethane and 25 g. (0.2 mole) of thionyl chloride is refluxed until it dissolved completely (approximately 4 hours). The dichlorethane is distilled off in vacuo and the residue is taken up in dichlorethane, which is distilled again. By repeating this operation 2 or 3 times one obtains the acid chloride, which may be used without any further purification.

To 5.5 g. (0.05 mole) of 3-hydroxymethylpyridine dissolved in 30 mls. of anhydrous dioxane one adds 13.4 g. (0.05 mole) of the acid chloride dissolved in 50 mls. of anhydrous dioxane and it is refluxed for 5 hours. After distilling off the dioxane, the residue is taken up with ether and filtered. The precipitate is dissolved hot in absolute alcohol, after passing a stream of gaseous hydrochloric acid through the solution. It is cooled, when the hydrochloride is precipitated. It is filtered and washed with ether. M.P.: 181° C.

*Elementary analysis.*—Calculated (percent): C, 57.35; H, 4.51; N, 7.43. Found (percent): C, 56.88; H, 4.51; N, 7.61.

EXAMPLE XIII

N-benzyl p-chloro-5-phenyl-isoxazole-3-carbonamide (No. 25)

To 5.4 g. (0.05 mole) of benzylamine suspended in 30 mls. of water one adds 8.4 g. (0.1 mole) of sodium bicarbonate.

To this suspension, whilst agitating vigorously, one adds drop by drop a solution of 12.1 g. (0.05 mole) of p-chloro-5-phenyl-isoxazole-3-carbonyl dissolved in 80 mls. of dichlorethane. When the addition is completed, it is heated under a reflux for 1 hour.

After the elimination of the solvents to dryness under a vacuum, one adds to the residue 100 mls. of water and the mixture is acidified with concentrated HCl. The precipitate obtained is filtered and it is recrystallised from a mixture of water and dimethylformamide.

Using the same method of operation one prepares:

N-(p-hydroxyphenyl)-p-chloro-5-phenyl-isoxazole-3-carbonamide;

N4(2,6-dichloro-phenyl-p-chloro-5-phenyl-isoxazole-3-carbonamide;
N,N'-di-[p-chloro-5-phenyl-isoxazole-3-carbonyl]N-cyclohexyl-1,3-diaminopropane;
N-cyclohexyl-N-isopropyl-5(3,4-dimethoxy-phenyl)-isoxazole-3-carbonamide;
N-cyclohexyl-N-cyanoethyl-5(3,4-dimethoxy-phenyl)-isoxazole-3-carbonamide;
N-cyclohexyl-N-ethyl-5(3,4-dimethoxy-phenyl)-isoxazole-3-carbonamide;
N-cyclohexyl-N-phenyl-5(3,4-dimethoxy-phenyl)-isoxazole-3-carbonamide;
N-cyclohexyl-N-methyl-5(3,4-dimethoxy-phenyl)-isoxazole-3-carbonamide, N,N-bis-β-chloroethyl-p-methoxy-5-phenyl-isoxazole-3-carbonamide;
N(2-carboxyphenyl)-p-chloro-5-phenyl-isoxazole-3-carbonamide, In this case it is necessary to carry out the reaction in the presence of 0.15 M of sodium bicarbonate to 0.05 M of amine.

N(2-carboxyphenyl)-p-methoxy-5-phenyl-isoxazole-3-carbonamide;
[3(N'-hydroxyethyl-piperazine-carbonyl)-p-chloro-5-phenyl-isoxazole] N'-hydrochloride.

The details of these products are shown in Table 5.

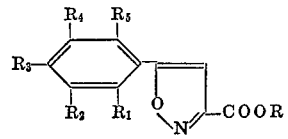

TABLE IV

| No. | $R_1$ | $R_2$ | $R_3$ | $R_4$ | $R_5$ | R | M.P., °C. | Calculated C | Calculated H | Calculated N | Found C | Found H | Found N |
|---|---|---|---|---|---|---|---|---|---|---|---|---|---|
| 19 | H | H | Cl | H | H | CH₂—⟨pyridyl⟩N, HCl | 196 | 54.70 | 4.02 | 7.97 | 54.61 | 4.10 | 7.88 |
| 20 | H | OCH₃ | OCH₃ | H | H | CH₂—⟨pyridyl⟩N, HCl | 181 | 57.35 | 4.51 | 7.43 | 56.88 | 4.51 | 7.61 |
| 21 | H | H | Cl | H | H | (CH₂)₃—⟨pyridyl⟩N, HCl | 160 | 57.00 | 3.19 | 7.39 | 56.72 | 3.31 | 7.28 |
| 22 | H | H | Cl | H | H | (CH₂)₂N(C₂H₅)₂, HCl | 165 | 53.49 | 5.61 | 7.80 | 53.29 | 5.72 | 7.75 |
| 23 | H | OCH₃ | OCH₃ | H | H | (CH₂)₂N(CH₃)₂, HCl | 203 | 53.56 | 5.93 | 7.85 | 53.39 | 5.74 | 7.97 |

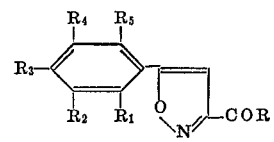

TABLE V

| No. | $R_1$ | $R_2$ | $R_3$ | $R_4$ | $R_5$ | R | M.W. | M.P., °C. | Calculated C | Calculated N | Calculated H | Found C | Found N | Found H |
|---|---|---|---|---|---|---|---|---|---|---|---|---|---|---|
| 24 | H | H | Cl | H | H | —NH—⟨C₆H₄⟩—OH | 314.72 | 283.6 | 60.71 | 3.53 | 8.89 | 61.32 | 3.69 | 8.53 |
| 25 | H | H | Cl | H | H | —NHCH₂—⟨phenyl⟩ | 312.75 | 202.5 | 65.35 | 4.18 | 8.94 | 65.16 | 4.17 | 8.96 |
| 26 | H | H | Cl | H | H | —NH—⟨2,6-Cl₂-C₆H₃⟩ | 367.70 | 206.2 | 52.25 | 2.46 | 7.62 | 52.78 | 2.48 | 7.69 |
| 27 | H | OCH₃ | OCH₃ | H | H | —N(cyclohexyl)(CH(CH₃)CH₃) | 372.65 | 92.4 | 67.52 | 7.53 | 7.53 | 66.54 | 7.56 | 7.55 |
| 28 | H | OCH₃ | OCH₃ | H | H | —N(cyclohexyl)(CH₂—CH₂CN) | 383.45 | 300 | 65.78 | 6.57 | 10.97 | 65.78 | 6.56 | 11.06 |

TABLE V—Continued

| No. | R₁ | R₂ | R₃ | R₄ | R₅ | R | M.W. | M.P., °C. | Calculated C | Calculated N | Calculated H | Found C | Found N | Found H |
|---|---|---|---|---|---|---|---|---|---|---|---|---|---|---|
| 29 | H | OCH₃ | OCH₃ | H | H | 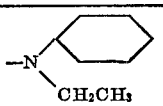 | 358.44 | 110.3 | 67.09 | 7.31 | 7.82 | 66.30 | 7.30 | 8.00 |
| 30 | H | OCH₃ | OCH₃ | H | H |  | 406.50 | 139.9 | 70.71 | 6.44 | 6.91 | 70.17 | 6.34 | 7.13 |
| 31 | H | OCH₃ | OCH₃ | H | H | 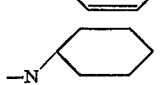 | 344.2 | 112.3 | 66.23 | 7.02 | 8.13 | 65.78 | 6.94 | 8.50 |
| 32 | H | H | OCH₃ | H | H | —N(CH₂—CH₂Cl)₂ | 343.20 | 110.2 | 52.50 | 4.70 | 8.17 | 52.57 | 4.80 | 7.85 |
| 33 | H | H | Cl | H | H | 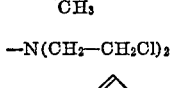 | 342.63 | 220.9 | 59.60 | 3.23 | 8.17 | 57.25 | 3.46 | 8.05 |
| 34 | H | H | Cl | H | H | 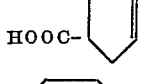 | 372.22 | 236.6 | 51.61 | 5.14 | 11.28 | 51.70 | 5.05 | 11.42 |
| 35 | H | H | OCH₃ | H | H | 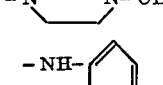 | 338.3 | 206.8 | 63.85 | 4.17 | 8.28 | 62.93 | 3.71 | 7.60 |
| 36 | 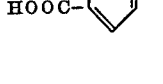 | | | | | | 567.48 | 191.3 | 61.3 | 4.98 | 9.89 | 61.75 | 5.00 | 10.02 |

EXAMPLE XIV

Guanido-3-carbonyl-p-bromo-5-phenyl-isoxazole (No. 37)

6.1 g. (0.05 M) of guanidine nitrate are added to a solution of 1.2 g. of sodium in 20 mls. of absolute ethyl alcohol and heats it under a reflux for 1 hour. It is left to cool and the sodium nitrate is filtered off. One then adds to the alcoholic solution of guanidine 15 g. (0.05 M) of ethyl p-bromo-5-phenyl-isoxazole-3-carboxylate dissolved in 40 mls. of ethyl alcohol and it is heated under a reflux for 24 hours.

After dilution with 50 mls. of water the precipitate is filtered and washed with water. 17 g. of product are collected. M.P.: 217° C.

*Elementary analysis.*—Calculated (percent): C, 42.71; H, 2.94; N, 18.12. Found (percent): C, 43.05; H, 2.97; N, 17.08.

EXAMPLE XV

Para-chloro-5-phenyl-phenyl-phenylhydrazine-3-carbonyl-isoxazole (No. 38)

The mode of operation used is identical to that for the general preparation of the amides as described above (Example XII). M.P.: 182° C.

*Elementary analysis.*—Calculated (percent): C, 61.30; H, 3.85; N, 13.38. Found (percent): C, 61.64; H, 3.83; N, 13.63.

EXAMPLE XVI

Measurement of the diuretic activity

The method used is a modification of that of Lipschitz and co-workers (W. L. Lipschitz, Z. Haddian, A. Kerpscar, Bioassay of diuretics, J. Pharmacol., 1943, 79, 97–100) by Gharib and co-workers (C. Gharib and co-workers: Rev. franc. Et. Clin. Biol., 1967, 12, 398–402).

Male rats weighing approximately 250 g. are used. Part of the animals are treated with hydrochlorothiazide at a dose of 50 mg./kg., selected as a reference substance, and another part is treated by the product of the invention, at the same dose. Using the animals fasting, one administers by means of an oesophageal probe:

at time $t$ 0.5% of the weight of the rat of physiological saline. The product or the hydrochlorothiazide is given at the same time;

after 45 minutes: 3% of the weight of the rat of 12% 95° ethyl alcohol in psysiological saline;

after 65 minutes: 2% of the weight of the rat of 12% 95° ethyl alcohol in physiological saline.

The urine is collected every hour for six hours. The volume of urine excreted is measured and the chlorides and sodium are determined.

| | Time in hrs. | Volume in cc. | Sodium in mg. | Chlorides in mg. |
|---|---|---|---|---|
| Controls | 1 | 1.7 | 2.5 | 3 |
| | 3 | 5.8 | 14.2 | 26.25 |
| | 6 | 1.2 | 4 | 6.8 |
| Hydrochlorothiazide | 1 | 2.6 | 5.8 | 8.5 |
| | 3 | 8.2 | 22.5 | 41.75 |
| | 6 | 2 | 8 | 14.45 |
| Compound No. 15 | 1 | 2.25 | 6 | 6.25 |
| | 3 | 7.4 | 17.3 | 34 |
| | 6 | 0.6 | 2.5 | 8.4 |
| Compound No. 2 | 1 | 1.4 | 3 | 6.2 |
| | 3 | 6.2 | 17 | 28.2 |
| | 6 | 1.2 | 4 | 6.2 |
| Compound No. 7 | 1 | 2.3 | 4.8 | 8.5 |
| | 3 | 6 | 14 | 25 |
| | 6 | 1.4 | 4.8 | 8 |
| Compound No. 13 | 1 | 2 | 3.8 | 7.5 |
| | 3 | 7.5 | 19.2 | 29.5 |
| | 6 | 1.6 | 6.8 | 7.4 |
| Compound No. 14 | 1 | 3.8 | 6.25 | 11.5 |
| | 3 | 10.6 | 37.4 | 65 |
| | 6 | 2 | 7.4 | 11 |

The activity of these products is similar to and in the case of certain compounds greater than that of hydrochlorothiazide.

EXAMPLE XVII

Measurement of the analgesic activity

Siegmund's method is used (E. A. Siegmund, R. A. Cadmus, GOLU: A method for evaluating both non-narcotic and narcotic analgesics. Proc. Soc. Exp. Biol. Med., 1957, b, 95, 729–731).

The injection of an irritant: phenylbenzoquinone, in a 0.02% solution, into the peritoneum of the mouse, determines stretching or torsional movements. The operation is carried out on a batch of controls and on a batch of mice to which compound No. 19 according to Example XI is administered at a dosage rate of 300 mg./kg. per os, 30 minutes prior to injection with the irritant.

controls: no mouse is protected;
the batch treated with compound No. 19 according to Example XI: 4 mice out of 10 carried out less than 5 torsions in 5 minutes and are regarded as protected.

This compound therefore possesses an analgesic effect.

EXAMPLE XVIII

Measurement of the sedative action—actimeter test

The modified Dews method is used (P. B. Dews, Brit. J. Pharmacol, 1953, vol. 8, p. 46) (J. R. Boissier, P. Simon, Arch. int. pharmacodyn. 1965, vol. 158, p. 212; J. R. Boissier, P. Simon and J. P. Tillement, Thérapie, 1966, vol. 21, p. 967).

The neuroleptic activity is evaluated in the mouse. The animals are placed separately in cages through which there pass intersecting beams of infrared light falling on photo-electric cells. Actimeters make it possible to total the number of light rays traversed by the animal in each cage and in this way to assess the motor activity. The substance to be tested is administered per os. Chlorpromazine is used as a reference substance.

The number of light beams passed through in 10 minutes is:

for the animals treated with chlorpromazine at a dosage rate of 5 mg./kg.: 88;
for the controls: 169;
for the animals treated with compound No. 15 at a dosage rate of 100 mg./kg.: 79

When used in sufficient doses, this compound possesses a sedative activity comparable with that of chlorpromazine.

EXAMPLE XIX

Potentialisation of the narcosis induced with mebubarbital—hypno-sedation test

A test is made to find whether the administration by gastric probe to the mouse of compounds forming the subject of the invention prolongs the mean time of sleep induced by the injection of mebubarbital. Chlorpromazine is used as reference substance.

The sleeping time is:

for the controls: 25 minutes;
for the animals treated with chlorpromazine at a dosage rate of 4 mg./kg., more than 65 minutes;
for animals treated with compound No. 15 at a dosage rate of 200 mg./kg.: 32 minutes.

When used in sufficient doses, this compound prolongs the sleeping time of mice.

EXAMPLE XX

Measurement of the cardiovascular effect

The action on the heart and the blood pressure has been tested on the chloralosed dog whose cardioaortic and sinocarotid reflexogenic zones are intact (dog with normal tension) or have been denervated (dog with hypertension).

As from a dose of 1 mg./kg. compound No. 20 brings about an increase in the contractile force of the heart and a fall in the general arterial pressure.

These two actions are highly significant at a dosage of 5 mg./kg.

This compound, the toxicity of which is particularly low (LD 0 higher than 1,200 mg./kg.-po in the mouse) possesses remarkable analeptic, cardiac and hypotensive properties both in the animal with normal tension and that with hypertension.

EXAMPLE XXI

It is possible to use compounds in human therapy which advantageously possess the following composition:

| For one tablet: | G. |
|---|---|
| Compound No. 13 according to Example VII | 0.100 |
| Kieselguhr | 0.100 |
| Sugar | 0.040 |
| Talc | 0.015 |
| Starch | 0.015 |
| Magnesium stearate | 0.005 |

The daily doses will be from 3 to 4 tablets possessing the above composition.

EXAMPLE XXII

It is possible to use for human therapy capsules which advantageously have the following composition:

| For one capsule: | G. |
|---|---|
| Compound No. 15 | 0.100 |

The daily doses will be from 3 to 4 capsules possessing the above composition.

EXAMPLE XXIII

It is possible to use for human therapy a solution for injection which advantageously has the following composition:

| | G. |
|---|---|
| Compound No. 13 according to Example VII | 5 |
| Sodium chloride | 0.3 |
| Distilled water q.s., 100 mls. | |

The daily doses are 5 mls. in subcutaneous or intramuscular injections.

EXAMPLE XXIV

A 50-year-old patient was hospitalised in a condition of asystole, with cardiac oedema, enlargement of the liver, pleural effusion.

He was given a daily injection of solution according to Example XXI, every other day, amounting to 5 injections in all. This was associated with a treatment with digitalin compounds.

The diuretic effect was considerable for the first 3 injections, but then became less. The secretion of sodium in the urine was distinct during the first few days. The clinical improvement was satisfactory.

EXAMPLE XXV

A 39-year-old patient was hospitalised for alcoholic cirrhosis with ascites. He had an abdominal collateral circulation, oesophageal varices, moderate oedema of the lower limbs.

The patient was given 3 tablets a day according to Example XIX for 7 days. The treatment was given in association with a treatment with liver extracts, vitamins, coagulation factors.

The diuretic effect is distinct and prolonged, the diuresis reaching 3,000 mls. during the first two days. The secretion of sodium in the urine is considerable; there is no intolerance.

What is claimed is:

1. A 5-phenyl-isoxazole-3-carboxylic acid of the formula:

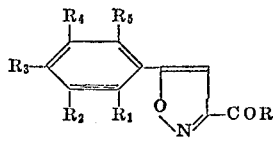

wherein $R_1$, $R_2$ $R_4$ and $R_5$ each represent hydrogen atoms; wherein $R_3$ represents a member selected from the group consisting of a hydrogen atom, a hydroxy group, a lower alky group, a lower alkoxy group, an oxyacetic group, a nitro group, and a halogen atom; and R represents a group indicated by —$OR_{10}$, wherein $R_{10}$ represents a member selected from the group consisting of a pyridyl group and a $C_1$–$C_3$ picolyl group.

2. The carboxylic acid of claim 1:
p-chloro-5-phenyl-(4'-pyridine)-propyloxy - 3 - carbonylisoxazole.

3. The carboxylic acid of claim 1:
5(3,4-dimethoxy-phenyl)-3-(3' - pyridine - methoxycarbonyl isoxazole.

4. The carboxylic acid of claim 1:
p-chloro-5-phenyl - 3(4' - pyridine-methoxycarbonyl)-isoxazole.

References Cited

Carlsson et al.: Chem. Abstracts, vol. 71, No. 13, p. 436, item No. 61,225q, Sept. 29, 1969.

ALAN L. ROTMAN, Primary Examiner

U.S. Cl. X.R.

260—268 C, 268 H, 295.5 R, 307 H; 424—250, 266, 272